(12) United States Patent
James et al.

(10) Patent No.: US 7,984,440 B2
(45) Date of Patent: Jul. 19, 2011

(54) INTERACTIVE AUDIO TASK SYSTEM WITH INTERRUPT RECOVERY AND CONFIRMATIONS

(75) Inventors: Frankie James, Sunnyvale, CA (US); Matthias U. Kaiser, Mountain View, CA (US); Shuyuan Chen, Palo Alto, CA (US); Keith S. Klemba, Palo Alto, CA (US)

(73) Assignee: SAP AG, Walldorf (DE)

( * ) Notice: Subject to any disclaimer, the term of this patent is extended or adjusted under 35 U.S.C. 154(b) by 1269 days.

(21) Appl. No.: 11/601,562

(22) Filed: Nov. 17, 2006

(65) Prior Publication Data

US 2008/0120616 A1 May 22, 2008

(51) Int. Cl.
*G06F 9/46* (2006.01)
*G06F 7/00* (2006.01)
(52) U.S. Cl. .......................................... 718/100; 701/36
(58) Field of Classification Search .................. 718/100; 701/36
See application file for complete search history.

(56) References Cited

U.S. PATENT DOCUMENTS

| | | | | |
|---|---|---|---|---|
| 6,266,612 | B1 * | 7/2001 | Dussell et al. | 701/207 |
| 6,456,973 | B1 * | 9/2002 | Fado et al. | 704/260 |
| 6,490,680 | B1 | 12/2002 | Scheidt et al. | |
| 6,834,387 | B2 * | 12/2004 | Jeyachandran et al. | 709/207 |
| 7,454,351 | B2 * | 11/2008 | Jeschke et al. | 704/275 |
| 2002/0152264 | A1 * | 10/2002 | Yamasaki | 709/203 |
| 2003/0009508 | A1 * | 1/2003 | Troia et al. | 709/107 |
| 2004/0025160 | A1 * | 2/2004 | Dice et al. | 718/102 |

OTHER PUBLICATIONS

Monk, "Running Head: Interruption Recovery, Recovering from Interruptions: Implications for Driver Distraction Research", http://72.14.221.104/search?q=cache:fm6OjbMnR , Jan. 8, 2006.
Yao, "Protocols for Secure Computations", *IEEE*, 1982, pp. 160-164.
Larrson, "A Bluetooth User Interface in the Car-A-Design Proposal for the Volvo Car Environment", Master Thesis in Interaction Design, IT Univ. of Gotëberg, Chalmers Dept. of Computer Science, 2004, pp. 1-136, Gothenborg, Sweden.
Latorella, "Effects of Modality on Interrupted Flight Deck Performance: Implications for Data Link", Research Paper, undated, pp. 1-5, NASA Langley Research Center, Hampton VA.
Driver Focus-Telematics Working Group, "Statement of Principles, Criteria and Verification Procedures and Driver Interactions with Advanced In-Vehicle Information and Communication Systems", Version 2, Apr. 15, 2002, pp. 1-65.
Adamczyk, "If Not Now, When?: The Effects of Interruption at Different Moments Within Task Execution", *Chi Letters* 2004/Paper, Apr. 24-29, 2004, pp. 271-278, Vienna, Austria.
Fogarty, "Predicting Human Interruptibility with Sensors", *ACM Transactions on Computer-Human Interaction*, vol. 12, Mar. 2005, pp. 119-146.

(Continued)

*Primary Examiner* — Meng A An
*Assistant Examiner* — Brian Chew
(74) *Attorney, Agent, or Firm* — Fountainhead Law Group P.C.

(57) ABSTRACT

Embodiments of the present invention improve interactive audio task execution in mobile systems such as vehicles, for example. In one embodiment, task interrupt handling is provided to allow user's to resume task execution at or near the point in the task where the interrupt occurred. In one embodiment, a user's confidence that secondary tasks are being performed accurately is improved by providing confirmation and help for users to be more accurate on their secondary tasks. Accordingly, users can increase their confidence and trust in the system and focus more attention on primary tasks, such as driving a vehicle. Some embodiments of the invention further provide for more comprehensive confirmation following an interruption.

25 Claims, 4 Drawing Sheets

OTHER PUBLICATIONS

Hearst, "Dissonance on Audio Interfaces", Trends & Controversies, Sep./Oct. 1997, pp. 10-16.

Horvitz, "Attention-Sensitive Alerting", Microsoft Research, undated, pp. 305-313, Redmond, WA.

Iqbal, "Leveraging Characteristics of Task Structure to Predict the Cost of Interruption", *CHI* 2006 Proceedings, Using Knowledge to Predict & Manage, Apr. 22-27, 2006, pp. 741-750, Montréal, Québec, Canada.

James, "Representing Structured Information in audio Interfaces: A Framework for Selecting Audio Marking Techniques to Represent Document Structures", Dissertation, Jun. 1998, pp. 1-215, Stanford, CA.

Lee, "Display Alternatives for In-Vehicle Warning and Sign Information: Message Style, Location, and Modality", Transportation Human Factors, 1(4), *Lawrence Eribaum Associates. Inc.*, 1999, pp. 347-375.

McFarlane, "Comparison of Four Primary Methods for Coordinating the Interruption of People in Human-Computer Interaction", *Human-Computer Interaction*, 2002, vol. 17, pp. 63-139.

Oulasvirta, "A Cognitive Meta-Analysis of Design Approaches to Interruptions in Intelligent Environments", *CHI*2004/ Late Breaking Results Paper, Apr. 24-29, 2004, Vienna Austria.

Strayer, "Cell Phone-Induced Failures of Visual Attention During Simulated Driving", *Journal of Experimental Psychology: Applied*, 2003, vol. 9, No. 1, pp. 23-32.

Wickens, "Processing Resources in Attention", *Academic Press, Inc.*, 1984.

* cited by examiner

INTERACTIVE AUDIO TASK SYSTEM WITH INTERRUPT RECOVERY AND CONFIRMATIONS

BACKGROUND

The present invention relates to interactive audio systems, and in particular, to interactive audio task systems and methods with interrupt recovery and confirmations.

Computer systems are becoming increasingly mobile. More than ever before, users are attempting to interact with computing resources while outside of their homes and offices in locations such as restaurants, trains, and other public spaces. Some users may even use their mobile devices while operating a vehicle, for example, which can lead to accidents. Because of the proliferation of mobile systems to support personal connectivity and business productivity, it is unlikely that vehicle drivers can be prevented from using computing resources while on the road. Therefore, it is desirable to develop user interaction paradigms that can support computer usage in a manner that maintains safe vehicle operation.

Within the driving context, the vehicle driver's primary attention is (or should be) on the driving task itself. Additional tasks, such as listening to the radio, talking with passengers, or interacting with mobile systems, are secondary and require the driver to allocate attentional resources away from driving. If attentional resources are properly focused on driving, this means that performance of the secondary tasks will be degraded, especially under difficult driving conditions, such as bad weather and heavy traffic.

One common way to alleviate the burden on the driver's attentional resources is to relegate the computer interaction to the audio channel. This approach is often used in systems developed for drivers, since the driver's audio attention appears to be much less vital to safe vehicle operation than the visual channel.

However, using audio to interact with mobile computing resources does not eliminate the problem of limited attention. Even when the audio channel is used, driving performance is typically degraded because of a misallocation of resources towards the secondary tasks. This may be caused because drivers are afraid to make mistakes in the secondary task, a problem that is likely to become more pronounced if the secondary task has (business or personal) importance to the user. For this reason it would be desirable to have a system that interacted with uses in a way that improved a user's confidence that secondary tasks are being performed accurately.

Related to the concept of improved accuracy is recovery following an interruption. Because of the nature of mobile computing, there are commonly situations where the operator's full attention is diverted away from the computing task being executed. For example, in the case of driving, there are frequently circumstances where the driver's full attention is diverted to the road, with no spare resources for secondary tasks. These circumstances include accidents, mechanical failures, and unexpected roadway obstacles. In such cases, secondary tasks may be suspended either automatically by the vehicle interface, or manually by the driver's lack of attention. Following an interruption, it would be desirable for the system to provide users with a graceful mechanism for resuming the secondary tasks, if so desired.

Similarly, mobile system interaction may be subject to normal changes in the environmental context, such as shutting off and starting up the mobile system. For example, unlike desktop interaction, where tasks can be performed or abandoned (mostly) based on the user's desires, vehicle-based interaction may be stopped because the user has completed the primary driving task, and now wishes to stop the car. In this case, it would be desirable to have a system that could resume tasks from the point where the break occurred.

Thus, there is a need for improved audio interactive systems. The present invention solves these and other problems by providing improved interactive audio task systems and methods with interrupt recovery and confirmations.

SUMMARY

Embodiments of the present invention improve interactive audio task execution in mobile systems such as vehicles, for example. In one embodiment, task interrupt handling is provided to allow users to resume task execution at or near the point in the task where the interrupt occurred. In one embodiment, a user's confidence that secondary tasks are being performed accurately is improved by providing confirmation and help for users to be more accurate on their secondary tasks. Accordingly, users can increase their confidence and trust in the system and focus more attention on primary tasks, such as driving a vehicle. Some embodiments of the invention further provide for more comprehensive confirmation and recovery following an interruption.

In one embodiment, the present invention includes a method of performing tasks using interactive audio comprising executing a task using an audio interactive interface on a mobile system, receiving an interrupt during task execution, storing task state information, receiving an indication that task execution is to be resumed, loading the stored task state information, and generating one or more audio confirmations specifying one or more completed portions of the task, wherein the audio confirmations are selected based on a first task boundary proximate to a point in task execution when the interrupt is received. In one embodiment, the first task boundary is the next task boundary in task execution. In another embodiment, the first task boundary is the most recently detected task boundary.

In another embodiment, the present invention includes an interactive audio system on a mobile system. The interactive audio system may comprise software, hardware, or a combination of software and hardware. In one embodiment, the interactive audio system comprises a text-to-speech translator, a speech recognizer, and a task execution engine for executing a task, wherein if an interrupt is received during task execution, task state information is stored, and wherein the stored task state information is loaded after the interrupt, and wherein said system generates an audio confirmation specifying one or more completed portions of the task when the task is resumed.

Embodiments of the present invention may include a computer-readable medium containing instructions for controlling a computer system to perform the interactive audio task execution techniques described below.

The following detailed description and accompanying drawings provide a better understanding of the nature and advantages of the present invention.

DETAILED DESCRIPTION

Described herein are techniques for recovering from interrupts and confirming interactive audio tasks. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
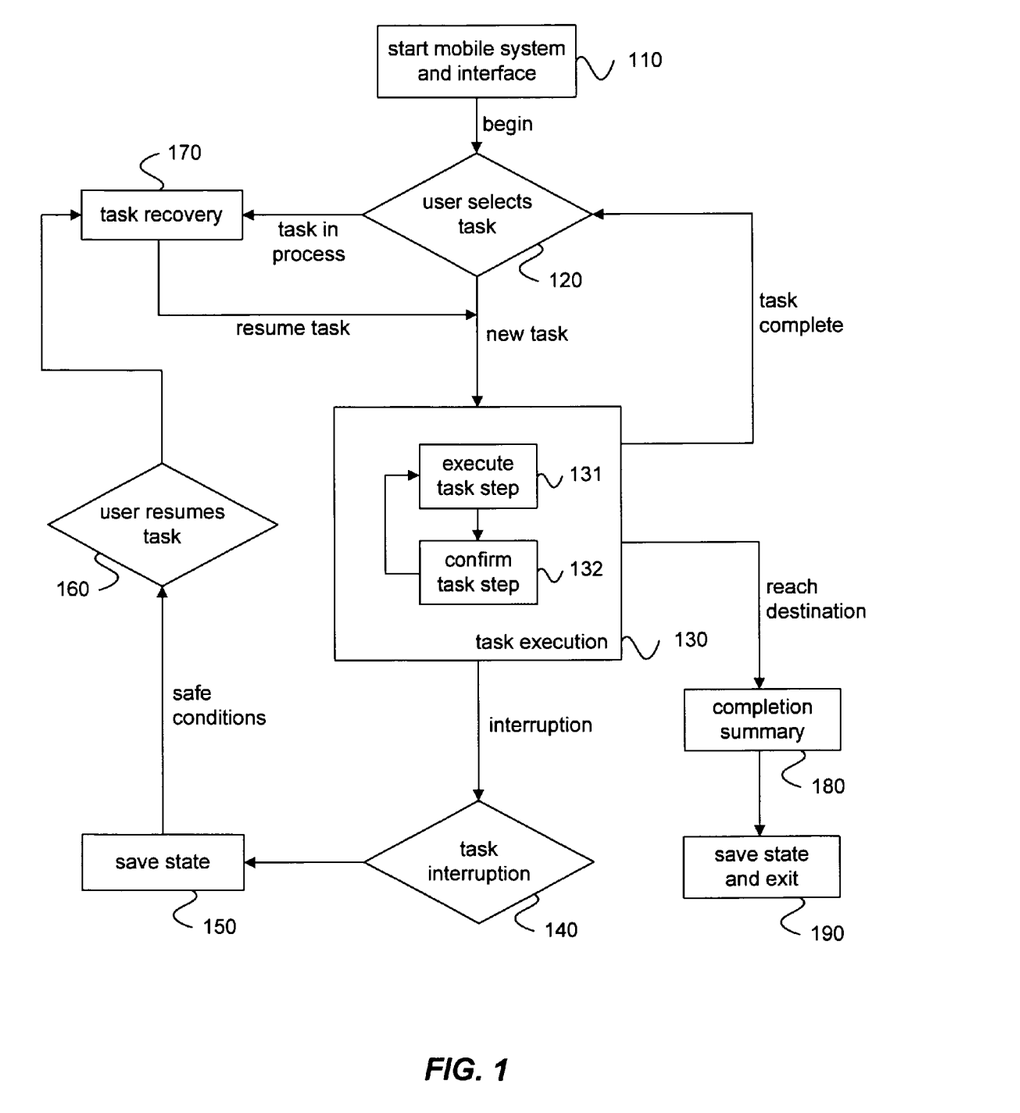
FIG. 1 illustrates interactive audio with interrupt recovery according to one embodiment of the present invention.

FIG. 1 illustrates interactive audio with interrupt recovery according to one embodiment of the present invention. A mobile system may include software, hardware, or a combination of software and hardware for performing interactive audio with a user. For example, steps of a task may be carried out by generating an audio prompt to a user corresponding to a task step (e.g., "enter your first name"), and the user may perform the task step by providing an audible response to the prompt (e.g., a user may speak "John"). However, as mentioned above tasks may occasionally be interrupted by outside events or by other tasks that are received in the system with a higher priority than the currently executing task. Embodiments of the present invention may interrupt a task and store state information for the task so the task may be restarted in approximately the same place where the interrupt occurred. In some embodiments, the system may generate confirmations to remind the user where they left off.

As illustrated in FIG. 1, a user may start a mobile system at 110 and begin an audio interactive task process. At 120, the user may select a task or process to perform. For example, when the system is turned on, the system may automatically generate audio prompts indicating the tasks that are available for selection. Additionally, the system may perform a check to determine if there are any incomplete tasks, which may have been interrupted during a previous session (e.g., if the mobile system was turned off or ran out of batteries in the middle of a task). A new or preexisting task may be selected by a user by speaking one or more words or phrases (or other audible indicators) associated with one of the available tasks. If the system recognizes the audio input, a corresponding task is selected for execution. Task execution may occur at 130. The system may retrieve task information that defines the task or process, including specifications or definitions of any subtasks or steps of a task, for example, or any software files such as documents that are received as inputs or generated as outputs as a result of task execution. At 131, a task step may be executed. For example, a task may be a vacation request approval that receives a vacation request document as an input and outputs an authorization of the request (e.g., as part of the same document or as another document). Task execution may involve retrieving the document, and may include parsing the document, for example, and performing text-to-speech processing of predefined fields to generating an audio signal to the user indicating a title of the task (e.g., "Vacation Approval"), the name of the person requesting the vacation (e.g., "Jane Smith"), the requested vacation date(s) (e.g., "Monday, October 30$^{th}$ through Friday, November 3$^{rd}$"). Task execution may allow the user to perform subtasks such as checking current projects in-progress of a person requesting vacation time, which may be part of the vacation approval document, for example. Additionally, the system may next generate audio stating options (e.g., "Approve Vacation or Check Project In Progress"). The user may check the status of projects for a person requesting vacation approval by executing a subtask with predefined steps indicating the projects a person may be working on and the status of each project, deadlines, etc. As described in more detail below, any of a variety of processes involving multiple tasks, subtasks, and steps may be performed using one or more embodiments of the present invention. After a task, subtask, or step is completed, the system may generate a confirmation at 132. The confirmation for the above example may be an automatically generated audio signal indicating that vacation approval for a certain person is completed (e.g., "Jane Smith Vacation Approval Denied"). When a task is completed, the system may return to 120 so the next task or subtask may be selected.

Embodiments of the present invention include systems that may respond to various types of interrupts. Interrupts may cause a task to be placed on hold, while the user addresses the source of the interrupt. Example interrupts may include automobile incidents that may cause a driver to be distracted away from the audio interactive task, local system signals such as system alarms indicating an error or alert in a car or an incoming call in a cell phone, sensor readings indicating that the battery of a mobile system is low or that the brakes of the car have been applied, for example. Another cause of interrupts may be new tasks received by the mobile system having a higher priority than the task being executed, for example. It is to be understood that a variety of factors may be used to generate interrupts to an interactive audio task software system. As illustrated in FIG. 1, the system detects task interruption signals at 140. If an interrupt is received, state information corresponding to one or more tasks, subtasks, or steps in a process may be saved at 150. The task may be selected again to be resumed, or the task may be automatically resumed if the interrupt is cleared. The user may resume a task at 160, and the system may enter a task recover state at 170. For example, if a new task is in progress, the interrupted task may not be resumed immediately. Additionally, the system may generate one or more audio confirmations specifying one or more completed portions of the task to help the user determine where in the task the interruption occurred. The audio confirmations may be selected based on a task boundary proximate to a point in task execution when the interrupt is received. For example, if an interrupt is received between two task boundaries, the system may generate audio confirmations based on the next task boundary in task execution or based on the most recently detected task boundary (i.e., the previous boundary). If the interruption occurs at a task boundary, the system may generate confirmations based on the particular task boundary where the interrupt occurred.

In one embodiment, the system may provide summaries to guide users through the audio interactive task processes. In one embodiment, the system may store a record of partially completed tasks and generate a summary of partially completed or interrupted tasks. For example, a summary of partially completed or interrupted tasks may be generated when a vehicle is started. Tasks may also have associated with them a priority. Additionally, the interrupted tasks include state information indicating the state of the task when the interruption occurred. As illustrated in FIG. 1, the system may provide a summary of completed actions 180 when a vehicle, for example, arrives at a destination. Prior to turning off the vehicle, the operator may save state information for any partially completed tasks and exit the system before shutting down the vehicle. Similarly, when the mobile device is turned on, the system may provide a summary of stored partially completed or interrupted tasks from the last session. In one embodiment, partially completed or interrupted tasks from another system are retrieved by the mobile device automatically when the device is turned on, and a summary may indicate to a user a list of work in progress. If one task is selected to be completed or resumed, the system may provide additional summary information to indicate where how much of the task is completed.

Figure 2:
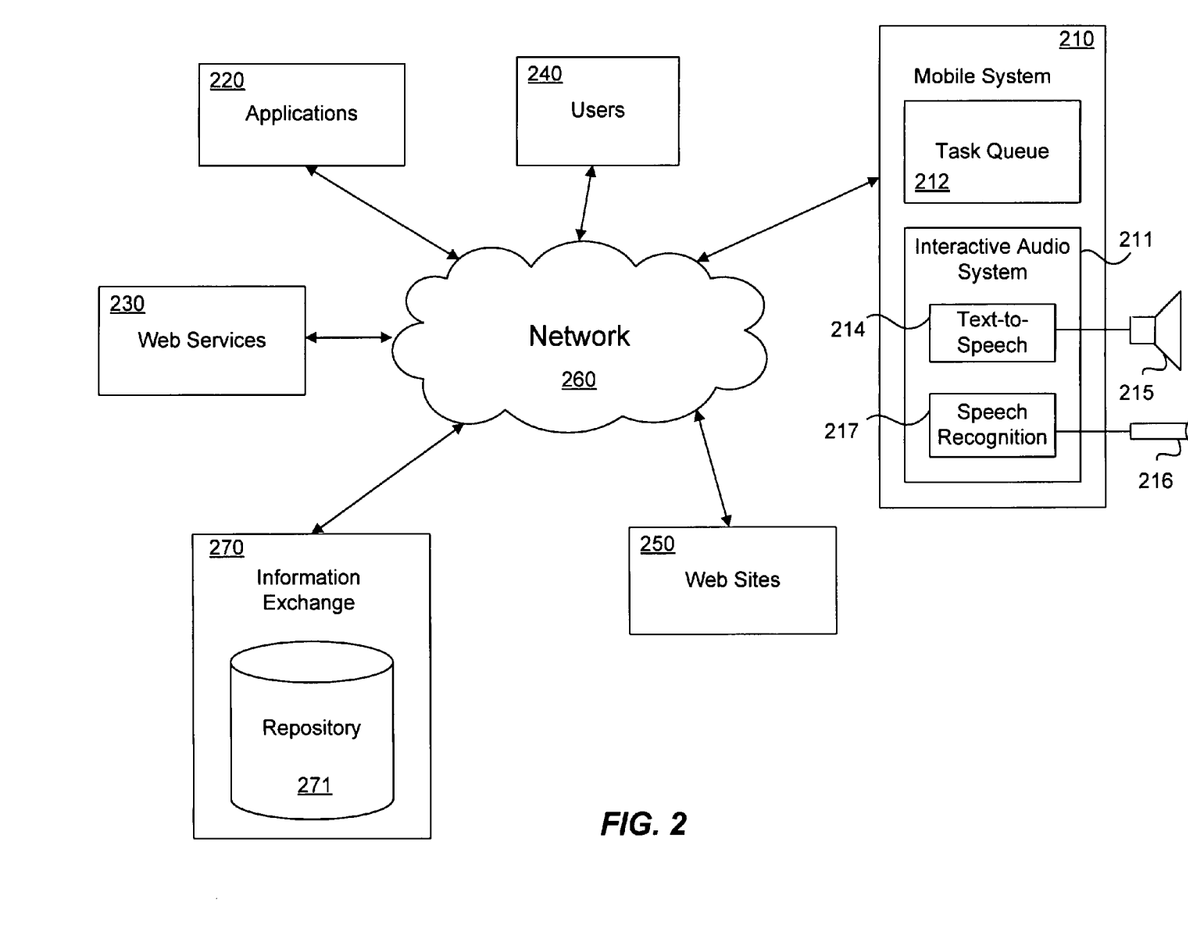
FIG. 2 illustrates an interactive audio system with interrupt recovery according to one embodiment of the present invention.

FIG. 2 illustrates an interactive audio system with interrupt recovery according to one embodiment of the present invention. Interactive audio systems according to the present invention may receive tasks and/or task information from sources external to the mobile system. In one embodiment, a mobile system 210 may be coupled to a network 260. Example mobile systems include vehicles, cellular phones, and personal digital assistants ("PDAs"), for example. Network 260 may include a wireless network such as a cellular network, satellite network connection, or WiFi network, for example. Any of a variety of wireless networks may be used. Network 260 may further include the Internet, for example. Network 260 provides connectivity to external resources such as applications 220, web services 230, web sites 250, or information exchange services 270. In one embodiment, mobile system 210 may receive tasks from one or more external systems. The tasks may come with documents or equivalent software files that are operated on during task execution. After a task is completed, the information may be returned to the originating system or forwarded to another system for further processing. In one embodiment, tasks and associated information may be temporarily stored in a repository 271 in a communication exchange system 270. When mobile system 210 is activated, tasks may be retrieved from the repository for execution. In one embodiment, the system may automatically download one or more partially completed or interrupted tasks when the mobile device is activated. Tasks may be partially completed or interrupted on one system and completed on another system. For example, a task may be started on a desktop system, partially completed, and automatically downloaded to a mobile system for completion when the mobile system is turned on. As another example, a task may be started on one mobile system (e.g., a cell phone or PDA), interrupted (e.g., when the cell phone or PDA is turned off), and automatically downloaded to another mobile system (e.g., a vehicle) for completion when the second mobile system is turned on.

Mobile system 210 may include an interactive audio system 211 and task queue 212. Task queue 212 may store tasks and associated task information. New tasks may be received in queue for execution on the mobile system. Alternatively, as mentioned above, a user may start a task on another system, such as a desktop or another mobile device, and retrieve the task onto the mobile system to continue or complete the task while in a mobile environment. Tasks that are not completed on the mobile system may be saved, sent to another application or information exchange system, to be retrieved and completed on another system. Tasks may be received as an XML specification document (i.e., a template) for describing a process including one or more tasks, subtasks, the steps, for example. The task information may also be received as an XML document. However, a variety of other formats may be used for specifying tasks and/or task information. Interactive audio system 211 may retrieve tasks from the queue and perform the task execution, confirmation, and/or interrupt functions described above, for example. Interactive audio system 211 may include a text-to-speech component 214 for translating specified portions of a task or task information into audio prompts. The speech prompts are provided to a user through a speaker 215. In other embodiments, a physical input device (e.g., a button on a vehicle's steering wheel) could be used to receive user inputs. In this embodiment, interactive audio system 211 further includes speech recognition component 217. In response to an audio prompt, a user may provide an audio input through microphone 216. The spoken response may be recognized by speech recognizer 217 and used during task execution. Audio prompts may include prompts of the task, subtask, or step issued before the step is executed. Audio prompts may alternatively include confirmations of one or more tasks, subtasks, or steps completed by a user. As describe below, confirmations may include hierarchical confirmations indicating where in a task the user previously left off or where an interruption occurred.

Figure 3:
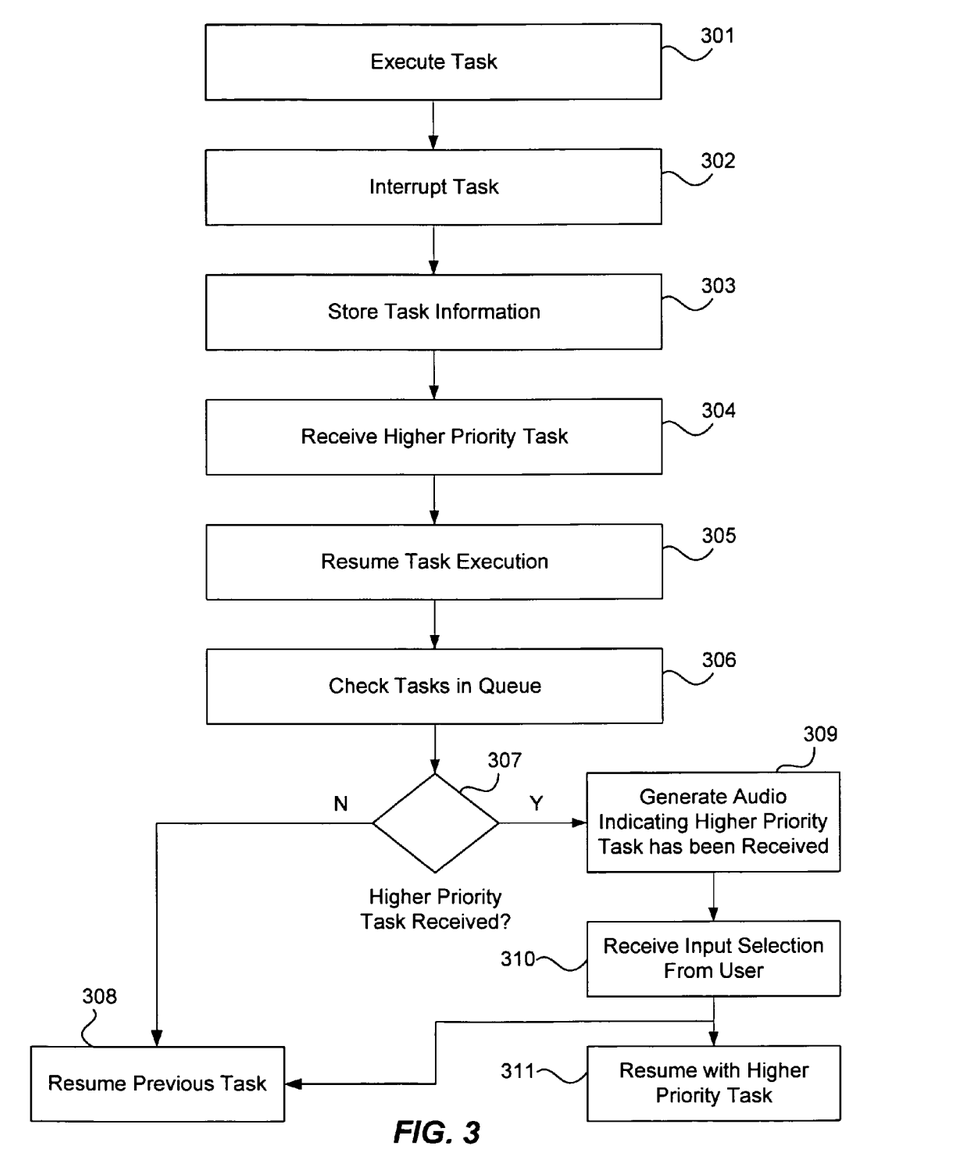
FIG. 3 illustrates a task recovery method according to one embodiment of the present invention.

FIG. 3 illustrates a task recovery method according to one embodiment of the present invention. At 301 a task is executed. Task execution may be initiated by a user providing an audio input selecting a task from a plurality of available tasks, for example. At 302, the task is interrupted. Interruptions may result from a variety of factors. For example, in some embodiments, some tasks or task information may have associated priority information (e.g., included as attributes of the task or a document) that may be used to determine the relative priority of different tasks. An interrupt of a currently executing task may be generated if another task having a higher priority than that task being executed is received. Alternatively, an interrupt may be generated if certain mobile system state information is received, such as a low battery alert, or if the wireless link strength falls below a certain threshold or fails altogether, for example. In a vehicle, an interrupt may comprise receiving vehicle state information, such as internal alerts related to driving conditions such as a braking alarm (indicating that the brakes have been asserted quickly), an antilock brake alarm, or collision detection alarms (e.g., if the vehicle is equipped with sensors to detect objects proximate to the vehicle), for example. At 303 the system stores task information. As described in more detail below, stored task information may depend on the extent to which a particular task has been completed. For example, in one embodiment the system tracks task boundaries, and the system may store different task state information depending on where in the task the interrupt occurred and whether or not the interrupt occurred on a task boundary. If an interrupt does not occurs on a task boundary, the system may store information corresponding to one or more partially completed steps of a task, for example. At 304, the system receives a higher priority task. At 305, the interrupt may be cleared and the previously executing task may be resumed. At 306, the system checks tasks in the task queue. At 307, the system may branch down different paths depending on the status of the queue. If a higher priority task is received, the system may next perform the action at 309, but if a higher priority task was not received during the interrupt, the system would automatically resume the previously executing task at 308. In this example, the task queue will include the interrupted previously executing task and the newly received higher priority task. Accordingly, the system will generate an audio prompt indicating a higher priority task has been received at 309. In response to the prompt, the user may speak an audio input directing the system to either perform the new higher priority task or resume the interrupted previously executing task. At 310, the system receives the input selection from the user. The system may either perform the newly received task at 311 or resume the interrupted task at 308 as directed by the user.

Figure 4:
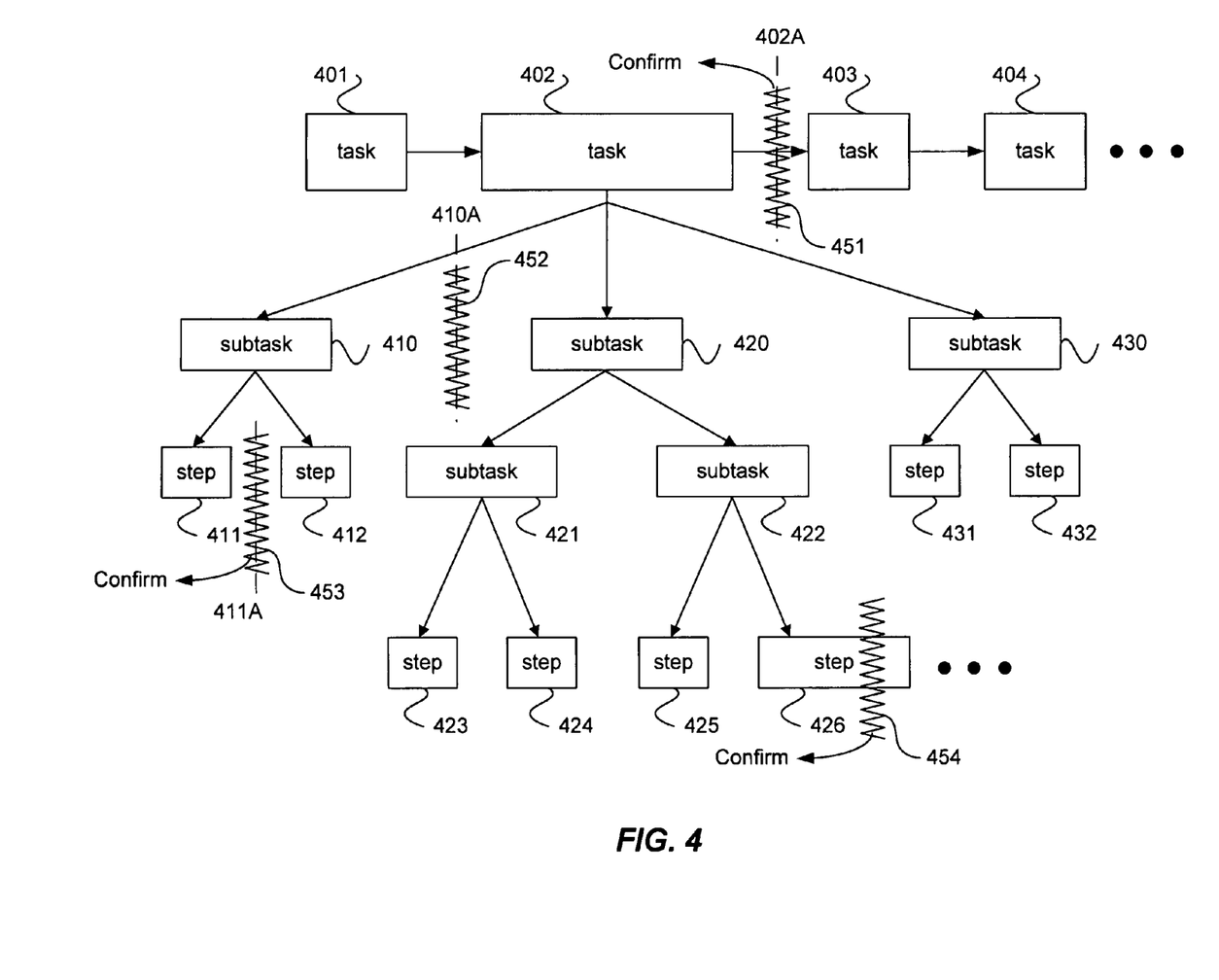
FIG. 4 illustrates task processing according to one embodiment of the present invention.

FIG. 4 illustrates task processing according to one embodiment of the present invention. As mentioned previously, a process carried out on an interactive audio system may include multiple tasks, and each task may include multiple levels of subtasks and a plurality of steps. The process illustrated in FIG. 4 includes tasks 401, 402, 403, and 404, and potentially more tasks. Example task 402 includes three subtasks 410, 420, and 430. Subtask 410 may include steps 411 and 412. Subtask 420 may include another layer of subtasks, such as subtask 421, which includes steps 423 and 424, and subtask 422, which includes steps 425 and 426. In this example, subtask 430 includes two steps 431 and 432. It is to be understood that FIG. 4 is merely illustrative. Any of a variety of task, subtask, and step hierarchies may be implemented. This example illustrates that tasks may include task boundaries. Task boundaries exist between and are defined by discrete units of task execution. Embodiments of the present invention may detect and/or track task boundaries. In this example, task boundaries are defined between task 402 and task 403. For example, when all of the subtasks and steps of task 402 are completed, the system will be at task boundary 402A (task boundaries are shown as vertical dashed lines in FIG. 4). Similarly, when all of the steps of subtask 410 are completed, the system will be at task boundary 410A. Likewise, when step 411 is completed, the system will be at task boundary 411A.

As an example, the process depicted in FIG. 4 may be a human resource management process. Task 402 may include all the steps necessary for approving vacations, for example. Vacation approval task 402 may include a subtask 410 for verifying the authority of the reviewing manager to authorize a vacation request. Step 411 may include entering and verifying employee information for a manager, and step 412 may include entering department information so that only requests for a particular department are accessed and the information for the department stored. Subtask 420 may include a subtask 421 for reviewing prior history of the employee including a step for entering accessing project status 423 (e.g., projects "in progress", deadlines, or schedules) for the employee requesting vacation time, with and a step 424 for accessing prior performance reviews, for example. Subtask 420 may further include a subtask 422 for authorizing the request, including a step 425 for approval or denial and a step 426 for entering notes. Task 402 may include another subtask 430 for securing the request including a step 431 for receiving a password or encryption code and a step 432 for specifying the next subsequent recipient of the request if multiple authorizations are required. In one embodiment, the task specification is provided as a template, such as a business process markup language ("BPML"), for example.

If the process illustrated in FIG. 4 is executed in an interactive audio system, task boundaries may be detected or tracked so that interrupts and confirmations may be efficiently implemented. FIG. 4 illustrates four interrupts that could occur during task execution (interrupts are illustrated as a serrated line and may or may not be coincident with task boundaries). Interrupt 451 may occur on the task boundary 402A between task 402 and task 403. Interrupt 452 may occur on the task boundary 410A between subtask 410 and subtask 420. Similarly, interrupt 453 may occur on the task boundary 411A between steps 411 and 412. However, interrupt 454 occurs in the middle of step 426, which is not on a task boundary. In one embodiment, a confirmation may be generated at each task boundary so that the user is reminded where they are in the task. In another embodiment, task boundaries may be used to determine the audio confirmations generated by the system during an interrupt. For example, the system may generate one audio confirmation if an interrupt occurs at a task boundary, and the system may generate another audio confirmation if the interrupt does not occur at a task boundary. Similarly, the system may generate one audio confirmation if an interrupt occurs at one task boundary, and the system may generate another audio confirmation if the interrupt occurs at another task boundary. Accordingly, the system may detect, track, and/or use the task state information and task boundary information to determine which audio confirmations to generate.

In one embodiment, task boundaries may be used to control the point in time that interrupts are asserted. For example, if an interrupt is received, some embodiments may not interrupt a currently executing task immediately. The system may continue executing the task until the next task boundary is reached. Upon reaching the task boundary, the system may check for interrupts. If an interrupt is present when the task boundary is reached, the system may assert the interrupt as described above at the task boundary.

In one embodiment, each task may include predefined prompts to a user for each task, subtask, and/or step that are generated if an interrupt occurs. Similarly, each task may include predefined prompts to a user for each task, subtask, and/or step that are generated after each corresponding task, subtask, and/or step is completed. The same prompts could be used for both interrupt recovery and task completion confirmation, or different prompts could be defined and used. As an example, if interrupt 411A occurs after step 411 is completed, the system may generate a predefined prompt corresponding to step 411 (e.g., the system may generate: "manager information"). In one embodiment, confirmation may include audio prompts (i.e., queues) corresponding to a predefined number of previously completed tasks, subtasks, or steps. For example, a user may specify that each confirmation should include the prompt for the task 402, subtask 410, and step 411. Accordingly, interrupt 411A may generate prompts corresponding to task 402, subtask 410, and step 411 (e.g., generating: "Vacation Approval—Management Verification—Manager Information"). Confirmations generated in response to completing portions of a task, including confirmation of the task, subtask, or step, may use the same or different confirmation prompts as used for interrupts, and the same number or different number of previously completed tasks, subtasks, or steps to be generated during a confirmation may be defined. The system may allow a user to specify any number of desired confirmations for previous portions of a task or process. Some users may want more confirmation prompts going farther back in the process to improve accuracy, and other users may want fewer confirmation prompts that do not go as far back in the process to improve speed.

In addition to generating confirmation prompts to resume a process after an interrupt, the system may store task state information based on where in the process the interrupt occurred. For example, interrupt 411A may cause the system to store task state information indicating the step completed (e.g., step 411), information associated with the step (e.g., a manager's information), and information associated with the task or subtask, if any. Each task, subtask, or step may have predefined associated task state information and task information to be stored if an interrupt occurs on a subsequent task boundary.

As illustrated by interrupt 454, an interrupt may not occur on a task boundary. In this case, the task state information and task information for previously completed tasks may be stored. Additionally, task state information for partially completed step 428 may be stored. The system may also store an indicator that the task, subtask, or step was only partially completed. Additionally, the system may store partially completed data for the task, subtask, or step. In this case, the system may store that portion of a note entered as part of the vacation approval process that a user entered before the interrupt occurred. Confirmations generated when an interrupt does not occur on a task boundary may include one or more previously completed tasks, subtasks, and steps, and the partially completed task, subtask, or step. In this example, when step 426 is resumed after interrupt 454, the system may generate a prompt corresponding to task 402, subtask 420, subtask 422, and step 426 together with an indicator that the task is resuming (e.g., the system may generate: "Vacation Approval—Approval for Jane Smith—Authorize Request—Notes—Resume"). Similarly, for interrupts that occur on task boundaries, other embodiments of confirmations may include an indicator at the end of a prompt that a task was completed (e.g., the system may append "Completed" to the end of each series of prompts if the interrupt occurred on a task boundary).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of performing tasks using interactive audio comprising:
   executing a task using an audio interactive interface on a mobile system, wherein said mobile system is a vehicle;
   detecting one or more task boundaries in the task;
   receiving an interrupt during task execution, wherein the interrupt comprises vehicle state information;
   storing task state information, wherein the storing comprises storing information corresponding to one or more partially completed steps of the task if the interrupt does not occur at a task boundary;
   receiving an indication that task execution is to be resumed;
   loading the stored task state information;
   generating one or more audio confirmations specifying one or more completed portions of the task,
   wherein the audio confirmations are selected based on particular task boundaries proximate to a point in task execution when the interrupt is received;
   generating a first audio confirmation if the interrupt occurs at a first task boundary;
   generating a second audio confirmation if the interrupt occurs at a second task boundary; and
   generating a third audio confirmation if the interrupt occurs between the first task boundary and the second task boundary.

2. The method of claim 1 further comprising generating one or more audio confirmations at each task boundary.

3. The method of claim 1 wherein the interrupt comprises receiving another task having a higher priority than the task being executed.

4. The method of claim 1 further comprising before loading the stored task state information, generating an audio prompt to a user to select between a previously executing task and another task.

5. The method of claim 1 wherein the task is represented as a template.

6. The method of claim 1 further comprising storing a plurality of documents, wherein each document has an associated task and associated task priority information.

7. The method of claim 1 further comprising before loading the stored task state information, accessing task priority information and generating an audio prompt to a user to select between a previously executing task and another task having a higher priority.

8. The method of claim 1 further comprising generating a summary of partially completed or interrupted tasks.

9. The method of claim 1 further comprising automatically downloading one or more partially completed or interrupted tasks when the mobile device is activated.

10. The method of claim 1 further comprising storing a record of interrupted tasks in the mobile device and generating an audio summary of the interrupted tasks.

11. An interactive audio system on a mobile system comprising:
    a computer;
    a text-to-speech translator;
    a speech recognizer; and
    a task execution engine, executable by the computer, for executing a task and detecting one or more task boundaries,
    wherein if an interrupt is received during task execution, task state information is stored,
    wherein information corresponding to one or more partially completed steps of a task is stored if the interrupt does not occur at a task boundary,
    wherein the stored task state information is loaded after the interrupt,
    wherein said interactive audio system generates one or more audio confirmations specifying one or more completed portions of the task when the task is resumed,
    wherein the audio confirmations are selected based on particular task boundaries proximate to a point in task execution when the interrupt is received,
    wherein a first audio confirmation is generated if the interrupt occurs at a first task boundary,
    wherein a second audio confirmation is generated if the interrupt occurs at a second task boundary,
    wherein a third audio confirmation is generated if the interrupt occurs between the first task boundary and the second task boundary,
    wherein said mobile system is a vehicle, and wherein the interrupt comprises receiving vehicle state information.

12. The interactive audio system of claim 11 wherein one or more audio confirmations are generated at each task boundary.

13. The interactive audio system of claim 11 wherein the interrupt is generated if another task having a higher priority than the task being executed is received by the mobile system.

14. The interactive audio system of claim 11 wherein the interrupt is generated if the mobile system receives predefined state information.

15. The interactive audio system of claim 11 wherein, before the task state information is loaded, an audio prompt is generated to a user to select between a previously executing task and another task.

16. The interactive audio system of claim 11 wherein the task is represented as a template.

17. The interactive audio system of claim 11 wherein each task includes associated task priority information, and wherein an audio prompt to a user is generated to select between a previously executing task and another task having a higher priority.

18. A non-transitory computer-readable storage medium containing instructions for controlling a computer system to perform a method of performing tasks using interactive audio, the method comprising:
    executing a task using an audio interactive interface on a mobile system, wherein said mobile system is a vehicle;

detecting one or more task boundaries in the task;
receiving an interrupt during task execution, wherein the interrupt comprises vehicle state information;
storing task state information, wherein the storing comprises storing information corresponding to one or more partially completed steps of the task if the interrupt does not occur at a task boundary;
receiving an indication that task execution is to be resumed;
loading the stored task state information;
generating one or more audio confirmations specifying one or more completed portions of the task,
wherein the audio confirmations are selected based on particular task boundaries proximate to a point in task execution when the interrupt is received;
generating a first audio confirmation if the interrupt occurs at a first task boundary;
generating a second audio confirmation if the interrupt occurs at a second task boundary; and
generating a third audio confirmation if the interrupt occurs between the first task boundary and the second task boundary.

19. The computer-readable storage medium of claim 18 further comprising generating one or more audio confirmations at each task boundary.

20. The computer-readable storage medium of claim 18, the method further comprising specifying a number of prompts to be generated after completing a portion of a task.

21. The computer-readable storage medium of claim 18, the method further comprising specifying a number of prompts to be generated after resuming an interrupted task.

22. The computer-readable storage medium of claim 18 wherein the interrupt comprises receiving another task having a higher priority than the task being executed.

23. The computer-readable storage medium of claim 18, the method further comprising, before loading the stored task state information, generating an audio prompt to a user to select between a previously executing task and another task.

24. The computer-readable storage medium of claim 18, the method further comprising storing a plurality of documents, wherein each document has an associated task and associated task priority information.

25. The computer-readable storage medium of claim 18, the method further comprising, before loading the stored task state information, accessing task priority information and generating an audio prompt to a user to select between a previously executing task and another task having a higher priority.

* * * * *